United States Patent

[11] 3,612,928

| [72] | Inventors | Stephen G. Hokky<br>5057 Evergreen Drive, North Olmsted, Ohio 44070;<br>Arthur G. Branch, 346 Columbia Road, and Charles B. Small, 213 Ohio St., both of Elyria, Ohio 44035 |
|---|---|---|
| [21] | Appl. No. | 21,151 |
| [22] | Filed | Mar. 19, 1970 |
| [45] | Patented | Oct. 12, 1971 |

[54] SUBMERGED DC MOTOR
4 Claims, 4 Drawing Figs.

[52] U.S. Cl. ..................................................... 310/87,
310/227, 310/228
[51] Int. Cl. ....................................................... H02k 13/10

[50] Field of Search............................................ 310/87,
241, 227, 228

[56] References Cited
UNITED STATES PATENTS

| 2,606,946 | 8/1952 | Fisher............................. | 310/54 |
| 2,862,123 | 11/1958 | Arsenault...................... | 310/241 |

*Primary Examiner*—D. X. Sliney
*Attorney*—J. D. Douglass

ABSTRACT: A submerged DC Motor is provided wherein the centerline of the flux field of the armature and the stator are so selected, and the thickness of the fluid film between the brushes and commutator is so selected to provide maximum brush life.

INVENTORS
CHARLES B. SMALL
STEPHEN G. HOKKY
ARTHUR G. BRANCH

SUBMERGED DC MOTOR

BACKGROUND OF THE INVENTION

This invention relates generally to the minimizing of brush wear in electric motors, and more particularly to providing an electric motor, submerged in a fluid, which motor has a high current and load requirement, and yet which has greatly extended brush life.

This invention is particularly useful in electric motors which are utilized as submerged fuel pumps for pumping aircraft fuel such as kerosene or gasoline from the fuel tanks to the engines.

One of the most desirable types of pumping mechanisms for pumping aircraft fuels from the fuel tanks to the engine is the so-called submersible pump, wherein the pump and motor are completely submerged within the fuel. However, with aircraft of larger, more powerful engines requiring great amounts of fuel, more powerful motors have been required for this function. It has been observed that, with conventional motor design, as the power in the motor increases, the brush life of the motor brushes drastically decreases. Indeed, in some cases, the power requirements are great enough that the brush life is so low as to be completely unacceptable for aircraft usage.

Attempts at solutions, such as providing multiple pumps, each with reduced load carrying capacity, have not proved to be economically feasible.

SUMMARY OF THE INVENTION

According to the present invention, a submerged DC electric motor is provided wherein the brushes and the stator magnetic field are positioned and the commutator wound so as to substantially reduce brush wear. Further, the pressure on the brushes is adjusted so that a minimum fluid film thickness is maintained which will provide the necessary lubrication and prevent mechanical wear but will reduce brush wear due to electrical discharge through the film.

DESCRIPTION OF THE PREFERRED EMBODIMENT

Figure 1:
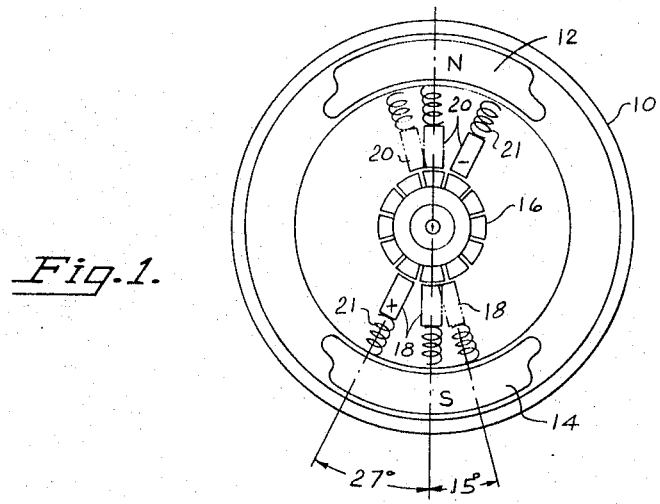
FIG. 1 is an end elevational view partially in section and somewhat schematic, depicting various placements of brushes in a DC electric motor with respect to the pole pieces.

In FIG. 1, an end elevational view partially in section, depicts, somewhat schematically, a DC electric motor designated generally as 10, having a pair of opposed pole pieces 12 and 14 of opposite polarity and designated respectively north and south. The motor includes an armature having a commutator, generally designated as 16, which commutator has conventional segments and slots. A pair of brushes 18 and 20 are provided which are designated as positive and negative brushes respectively, and which function in a conventional manner to provide power to the motor and cause rotation. A pair of springs 21 bias the brushes 18 and 20 into engagement with the commutator. A gap is shown between the brushes and the commutator which represents a film of the liquid in which the motor is submerged. The gap is greatly exaggerated for clarity of showing it being understood that this gap is merely a very thin film of liquid.

The brushes are shown in solid outline rotated 27 degrees from a line passing through the midpoint between the north and south pole pieces, this rotation being in a direction to lead the field. This is the preferred position of the brushes in the herein described embodiment, the reason for which will be discussed presently.

FIG. 1 also shows, in phantom outline, the brushes at various other angular positions. These positions are representative of the various positions tested to determine the position of optimum brush wear. The determination of the condition for this optimum resulted from an investigation of power losses of high capacity submersible motors, which brush life with conventional designs was observed to be very low and power losses were observed to be very high.

Figure 2:
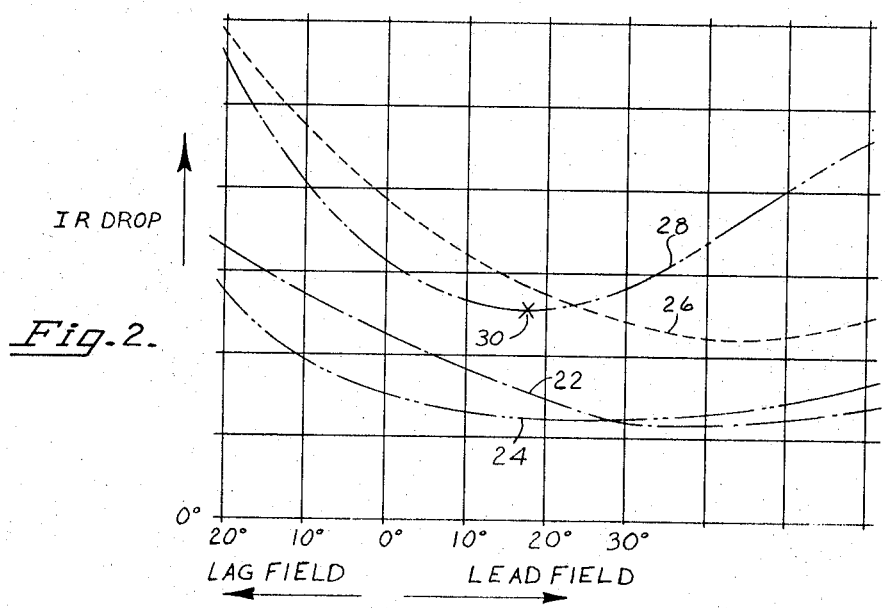
FIG. 2 is a graph showing the watts loss between each of the two brushes and the commutator at various angular positions, and also showing the combined loss of the two brushes at various angular positions, and further showing the efficiency of the motor with the brushes at various positions.

In the course of investigating the various power losses in a submersible pump and motor, measurements were made of the voltage drop across each of the brushes and the commutator with the brushes rotated, with respect to the permanent magnet pole pieces, to various predetermined positions and the pump run at rated capacity and speed. A graph of the results of the watts loss between the brushes and the commutator are shown in FIG. 2. Curve 22 represents the voltage drop between the negative brush and the commutator at various angular positions, and curve 24 represents the voltage drop between the positive brush and the commutator at various angular positions. Since the current is constant for these tests, the curves also represent voltage drop or gradient between the brushes and commutator. The combined watts loss of the two brushes at any given position can be obtained by arithmetically adding these two curves as shown in curve 26.

Figures 3, 4:
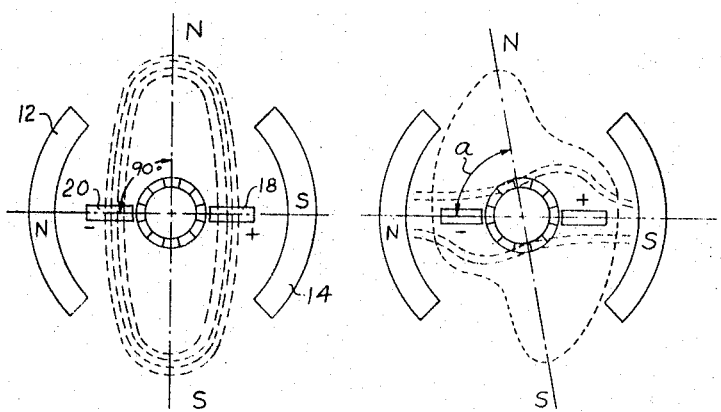
FIG. 3 is a diagrammatic representation of the zero or geometric neutral position of the brushes.
FIG. 4 is a graphic representation of the interaction of the flux fields provided by the armature and pole pieces.

In making these measurements, the zero angular position of the brushes, known as geometric neutral, is defined as that point where the brushes lie on the centerline of the north and south pole pieces with the armature wound and commutator connected to provide a magnetic field from the armature, the centerline of which is disposed at a 90° angle with respect to the centerline of the north-south pole pieces as shown diagrammatically in FIG. 3. This position and selection of terminology disregard any interaction between the two flux fields which actually may change their relative positions. This interaction of the flux fields is shown in FIG. 4 which graphically shows how this interaction can change the 90° relation to some other angle $a$. It is to be understood that by changing the relative position of the brushes and pole pieces or by changing the winding of the armature, the center line of the flux field produced by the armature can be changed. Thus by the use of geometric neutral, as defined above, permits the selection of a constant, fixed physical point as a reference for these other positions. As used herein, angular relation of the brushes is with reference to the zero or geometric neutral point as defined above.

The efficiency of the motor was also measured and is plotted on this graph, although to a different scale, and is shown as curve 28. The efficiency is plotted as watts input required to pump a given volume at a given speed at the various angles of the brushes.

Specific values are not given on the curves, since these values on both the abscissa and ordinate will vary with different fluids, speeds and loads.

As can be seen in FIG. 2, a rotation of the brushes in a direction to cause them to lead the field, i.e., to the right in FIG. 2, will cause an increase in efficiency up to a point shown as point 30 on curve 28, and rotation past this point will then cause a decrease in efficiency. Thus, positioning of the brushes with respect to the pole pieces can be utilized to adjust the efficiency. Also, as is well known, positioning the brushes can be used to change motor speed.

Also as can be seen from FIG. 2 at the zero or centered position of the brushes, a rotation of either brush in a direction to cause it to lag the field, i.e., to the left as shown in FIG. 2, will cause an increase in the watts loss across the fluid film between the brushes and the commutator. An angular change in a direction to lead the field produces a decrease in the watts loss across the brushes and the commutator to a point (different on each curve) after which further rotation causes an increase in voltage drop. The reason for the difference in voltage drop of various angular positions of the brushes with respect to the pole pieces is not completely understood. However, it is believed that this is due at least in part to the interaction of the flux fields associated with the pole pieces with the flux fields produced by the armature. The mechanism of the interaction of how the watts loss is changed by this interaction is not understood, nor is it known what other factors, if any, may influence this value.

During the course of investigating the effect of brush rotation on voltage drop across the brushes and commutator, it was discovered that the wear rate of each of the brushes is directly proportional to the watts loss between the brush and the commutator, i.e., the lower the watts loss, the lower the brush wear, and conversely, the higher the watts loss, the higher the wear on the brush. Thus, the curves 22 and 24 also are representative of the wear rate of the brushes as a function of brush position and thus indicate how brush wear can be minimized by properly selecting the angular position of the brushes. It should be noted that these curves also indicate the reason why, at all but one given angular position, the brushes will wear unevenly, and depending upon the angular position, one or the other of the brushes, but not necessarily the same brush, will wear more rapidly than the other.

The reason for the relationship between the voltage drop between the brushes and the commutator and the wear rate of the brushes is not fully understood but is believed to be due at least in part to the phenomenon of material removal caused by electrical discharge between the brush and the commutator through the film of liquid maintained therebetween. With respect to this phenomenon of material removed by electrical discharge, the greater the voltage gradient, the more rapid will be the rate of material removal. Thus, with a voltage gradient existing between the commutator and the brushes, and with a film therebetween through which the electrical discharge can take place, there will be a tendency toward material removal, and the greater this voltage gradient, the greater will be the rate of material removal. Hence, minimizing voltage gradient will minimize brush wear. However, whatever is the cause, the brush wear can be minimized by constructing the motor so that the relationship of the flux fields produce minimal voltage drop in the brush.

It was also theorized that, if material wear was due, at least in part, to material removal by electrical discharge through fluid film, the wear could be further minimized by reducing the thickness of the film to a minimum, since at any given voltage, the rate of removal of material by electrical discharge is also proportional to the thickness of the film between two pieces. Expressed another way, the thicker the film, the more rapid will be the rate of removal, and the thinner the film, the slower will be the removal rate. Therefore, further tests demonstrated that it is desirable to apply a pressure to each of the brushes to reduce to a minimum thickness the film maintained between the brushes and the commutator, in order to reduce the rate of material removal due to the electrical discharge. However, the pressure on the brushes should not be so great as to completely destroy or break down the film and cause the brushes to come into too much physical contact with the commutator without a film of material therebetween, inasmuch as with such a complete direct material-to-material contact, mechanical or abrasive wear will become a major factor in removing material from the brush. Hence, it is desirable to provide a pressure on the brushes to reduce the film to a minimum value but which will maintain as much film as possible and not break the film and cause too great a material-to-material contact between the brush and the commutator.

As was indicated above, it is believed that electrical discharge is at least partially responsible for material wear. As is well known, there is a constant building and collapsing of electrical fields in the armature circuits. This building and collapsing of fields causes high momentary currents in both directions, thus causing each brush to alternately be anode and cathode with respect to the commutator. In this way the electrical discharge causes erosion of both the brush and the commutator. It is known that the relative position of the flux fields at the time of commutation has an effect on the magnitude of the currents. Also, it is known that the resistance of the contact area between the brush and commutator effects the energy dissipated during the periods of current flow. Hence, by control of the flux field positions, and the control of fluid film thickness, energy dissipation can be minimized and resultant material loss minimized to thereby maximize brush life.

Measurements of voltage drop across the commutator and brushes with different brush angles and brush pressure in different fluids and at various loads and speeds, revealed that the exact brush position and brush pressure for minimizing voltage drop between the brushes and the commutator, and hence minimizing brush wear, will vary with different materials being pumped and also will vary with variations in the speed and capacity of the motor. Also, these changes are not necessarily of the same magnitude or direction. Further, the curves change size, shape and relationship to each other, and they may not even cross under certain conditions. However, when the material to be pumped is known, and the design speed and capacity of the motors have been established, it is a relatively simple matter to run a few simple tests at various angular positions of the brushes at various pressures to determine the exact shape and positions of the curves 22 and 24 and 28 and to establish the spring pressure. From this, the brush angles and pressure which will produce the desired results can be selected.

For example, the curves 22, 24, 26 and 28 were established for a pump running in gasoline. It will be noted from examining FIG. 2 that the maximum efficiency, i.e., the low point of curve 28, does not coincide with either of the low points of curve 22 or 24, nor does it coincide with the crossover point between curve 22 and 24 where brush life is equal. For the speed and load tested the crossover point of the curves 22 and 24 was approximately 27°. Thus, in designing a motor, the designer might well choose the crossover point of 27° for the selected brush angle, since this produces a value which is very close to, if not at the minimum value of the negative brush and which will give equal brush wear. Selection of the lower value at a greater angle with respect to the positive brush would not minimize the life of the negative brush. Also, this point is reasonably close to, although not coincident with, the maximum efficiency of the motor when pumping this fluid. Further, the designer would select a pressure which would provide a minimal fluid film between the brushes and the commutator in gasoline at the rated speed. This pressure can be determined experimentally for any fluid which is to be pumped. Thus, by utilizing the information shown graphically in FIG. 2, and the fact that a minimum film thickness is desired without having excessive material-to-material contact, a fluid immersed motor driven pump can be provided, which motor brushes have a significantly increased brush life at increased efficiency for pumping material at a given speed at a given load.

As an example of this increase which is produced by utilizing the information shown in FIG. 2 and maintaining a minimum fluid film, it was desired to design a submerged fuel pump for gasoline which would have a pumping capacity of 340 lbs. per hour against a head of 34 p.s.i. An initial design of such a pump was made for the above described condition before the relationship of brush angle with respect to wear life was known or appreciated. The motor was designed in a conventional way with the brushes being maintained approximately at the zero point as defined above. No attempt was made to regulate or control the pressure on the brushes, springs being provided which were merely strong enough to maintain the brushes firmly and securely in place and prevent looseness or chatter.

In the initial test of such a conventionally designed pump, the input wattage was approximately 150 watts, and one of the brushes failed after 160 hours of operation.

When the above factors were appreciated, the pump was designed with the brushes rotated approximately 27° leading the field which is represented by the crossover point of the curves 22 and 24 of FIG. 2. The springs 21 holding the brushes were selected so as to provide sufficient pressure to maintain a minimum film between the brushes and the commutator without causing the commutator and the brushes to come into physical contact. The motor was run at the same speed and the same load pumping the same material, and a brush life of 1,400 hours or more was obtained from motors designed according to these criteria. In fact, brush life in excess of 20,000 hours on other size motors has been achieved utilizing the above criteria.

Thus, it is possible, by properly selecting the brush angle and the pressure against the brushes, to provide a submersible pump which has vastly extended brush life while pumping a large load with high energy requirements.

We claim:

1. In a direct current motor which has a pair of spaced opposite polarity pole pieces, and commutator means and brushes operative thereagainst, and wherein the commutator is immersed in liquid, the improvement which comprises, positioning said brushes in angular relationship with respect to the pole pieces to position the armature and stator fields relative to each other to provide substantially the minimum watts loss between said brush having the greatest watts loss and the commutator at rated load and speed.

2. In a direct current motor wherein there are a pair of spaced opposite polarity pole pieces, and commutator means and brushes operative thereagainst and wherein the commutator is immersed in a liquid, the improvement comprising, biasing means exerting pressure on said brushes to provide a minimum film thickness without substantial contact between the surface of the brushes and the surface of the commutator.

3. A method of reducing brush wear in a DC motor having at least the commutator and brushes submerged in liquid to provide optimum brush life comprising the steps of;

A. determining the watts loss between each of the brushes and the commutator at various angular positions of the centerline of the flux field produced by the armature with respect to the centerline of the flux field of the stator, B. plotting curves of the values obtained in step No. A; and C. selecting an angle between the centerline of said flux fields wherein the watts loss of the brush having the greatest loss is substantially a minimum.

4. The method as defined in claim 3 further characterized by providing a biasing force on the brushes against the commutator to provide minimum fluid film thickness without substantial contact between the surface of the brushes and the surface of the commutator.